Patented Nov. 30, 1926.

1,609,070

UNITED STATES PATENT OFFICE.

WILLIAM H. DYE, OF INDIANAPOLIS, INDIANA, ASSIGNOR TO DISINFECTANT AND FERTILIZER COMPANY, OF INDIANAPOLIS, INDIANA.

DISINFECTANT FERTILIZER.

No Drawing.   Application filed August 19, 1925.   Serial No. 51,082.

This invention relates to an improvement in disinfectant-fertilizer.

The object of my invention is to provide a fertilizer which will disinfect the soil and seed, so as to destroy all injurious germs and insects, thus protecting the plants. An application of the disinfectant-fertilizer is considered sufficient to disinfect the soil and seed for a period of approximately ten years.

The disinfectant works on the soil and seed and destroys the germs and insects by reason of its throwing off fumes which serve this purpose. It is applied as an ingredient of fertilizer and so effectively acts as a disinfectant.

The important features of the invention is that creosote oil may be placed on saw-dust, and when mixed with the soil and seed, it will disinfect the same for a period of ten years, as it throws off fumes that destroy all the germs and insects, thus protecting the plants.

In preparing my disinfectant-fertilizer, I preferably use the following ingredients:

10 lbs. oil creosote,
40 lbs. sulphur,
10 lbs. saw-dust,
1,140 lbs. humus,
500 lbs. calcium carbonate sand,
150 lbs. animal phosphate,
150 lbs. animal and fish tankage.

When so used, the composition forms the complete fertilizer containing the disinfectant, but the first five ingredients, namely, oil creosote, sulphur, saw-dust, humus, and calcium carbonate sand, may be used as a filler for fertilizer and be combined with any already formed fertilizer to provide my disinfectant-fertilizer, and when so used, as a filler, the disinfectant will operate the same as above described.

I claim:

1. A disinfectant fertilizer composition comprising creosote oil, sulphur, calcium carbonate, and sawdust.

2. A disinfectant fertilizer composition comprising creosote oil, sulphur, and calcium carbonate absorbed in sawdust to be applied to soil or seed.

3. A disinfectant fertilizer composition comprising creosote oil, sulphur calcium carbonate, humus, and sawdust in substantially the proportions set forth.

4. A disinfectant fertilizer composition comprising approximately ten pounds creosote oil, forty pounds sulphur, ten pounds sawdust, twelve hundred pounds humus, and five hundred pounds calcium carbonate.

5. A disinfectant fertilizer comprising proportionately ten pounds creosote oil, forty pounds sulphur, ten pounds sawdust, five hundred pounds calcium carbonate, eleven hundred and forty pounds humus, one hundred and fifty pounds animal phosphate, and one hundred and fifty pounds animal and fish tankage.

In testimony whereof I affix my signature.

WILLIAM H. DYE.